United States Patent Office 3,699,038
Patented Oct. 17, 1972

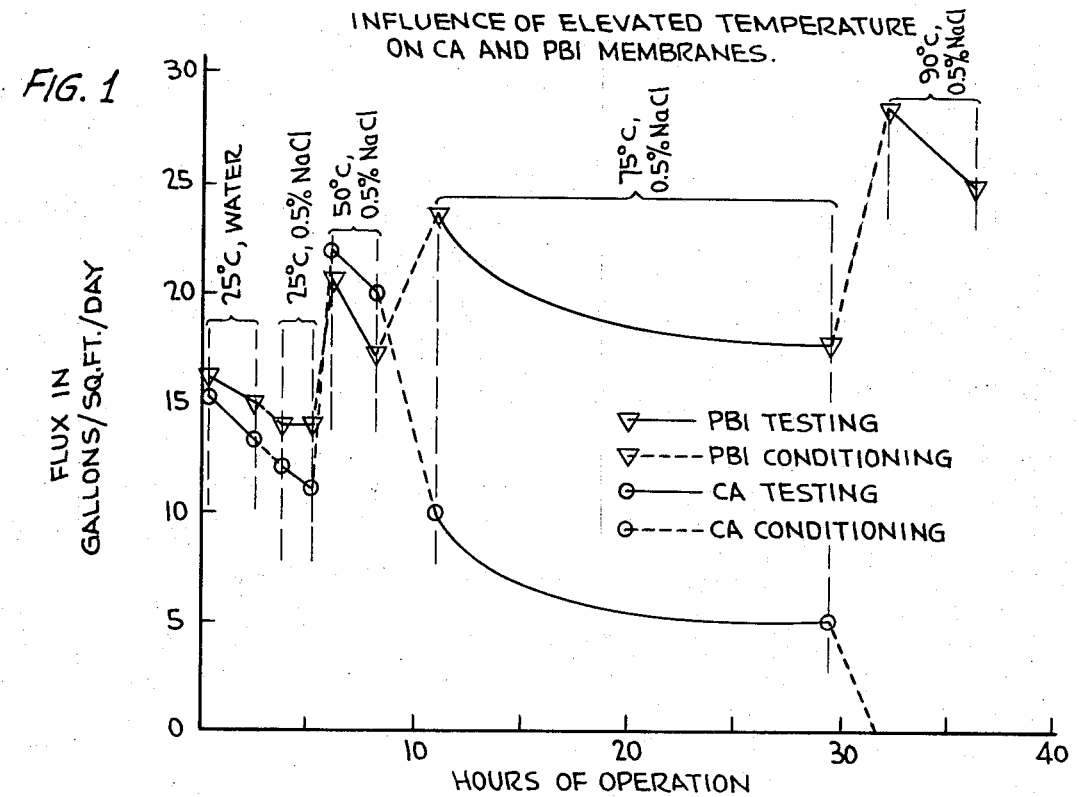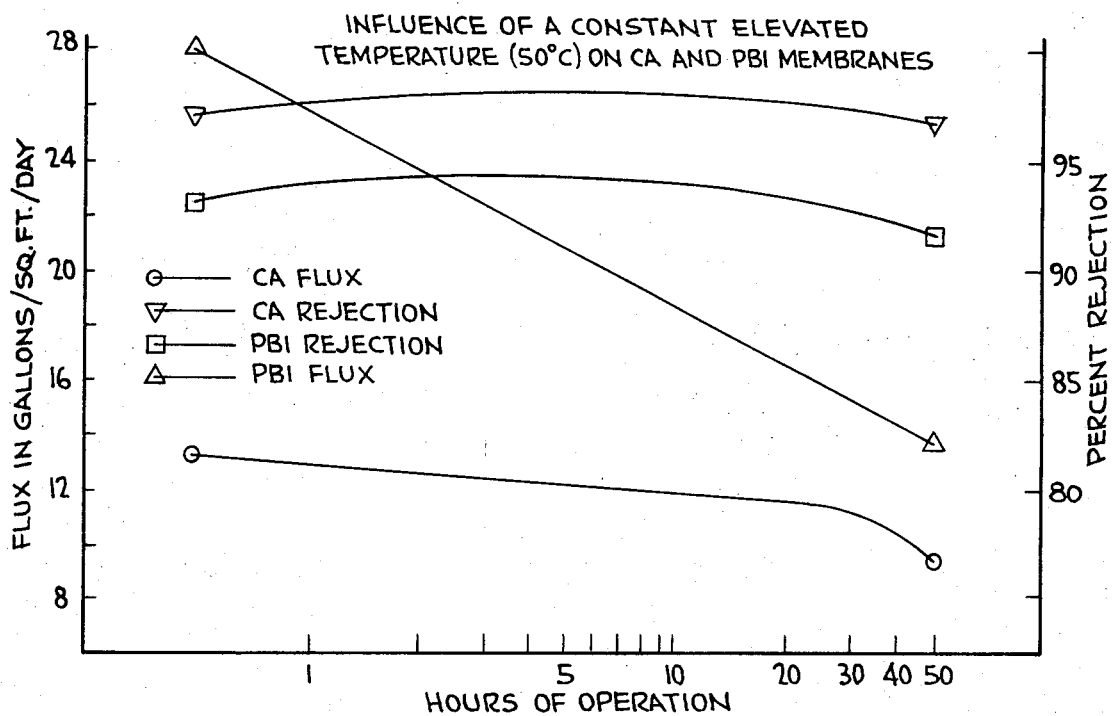

3,699,038
PRODUCTION OF IMPROVED SEMIPERMEABLE
POLYBENZIMIDAZOLE MEMBRANES
Abraham A. Boom, Martinsville, N.J., assignor to
Celanese Corporation, New York, N.Y.
Filed Apr. 22, 1970, Ser. No. 30,846
Int. Cl. B01d 13/00
U.S. Cl. 210—23
21 Claims

ABSTRACT OF THE DISCLOSURE

A process is provided for producing improved semipermeable membranes which find particular utility in the separation of components of a solution. A solution of a polybenzimidazole polymer is deposited upon a support to form a wet film, an amount of solvent is evaporated from the wet film sufficient to allow the formation of a thin layer of higher density at the exposed surface of the film, the resulting film is washed with a non-solvent for the polybenzimidazole polymer to remove residual solvent thereby forming a semipermeable polybenzimidazole membrane, and the resulting membrane is annealed by contact with an organic liquid under conditions found capable of substantially enhancing the properties of the same.

The polybenzimidazole membranes find particular utility in reverse osmosis desalination procedures. The annealing step of the present process substantially improves the performance of the membranes in such a separation.

BACKGROUND OF THE INVENTION

In recent years there has been increasing interest expressed in the development of microporous membranes of a semipermeable nature which are useful in separating the components of a solution. For instance, semipermeable membranes have been looked to as a possible means to demineralize or purify otherwise unusable water and to thereby alleviate the increasing demands for potable water necessitated by the rapid growth of the population and industry in many parts of the world. Separation techniques which employ such membranes include electrodialysis, reverse osmosis, ultrafiltration, etc.

Electrodialysis separations employ an electrolytic cell having alternatnig anionic and cationic membranes that collect desalted and concentrated solutions in adjacent compartments. Such a technique can be useful to purify liquids by removing ionizable impurities, to concentrate solutions of electrolytes, or to separate electrolytes from non-electrolytes.

As opposed to the charge dependent types of separations, reverse osmosis utilizes pressure to move materials which may be either ionic or non-ionic selectively through a membrane. Ultrafiltration, which is very similar, uses gravity or applied pressure to effect separation using membranes which act as submicronic sieves to retain large molecules and permit the passage of small, ionic, or non-ionic forms.

The desalination of salt or sea water through the use of semipermeable membranes is commonly characterized by the use of pressure in excess of osmotic pressure and is therefore termed reverse osmosis. The natural tendency for a solution of a higher concentration separated from a solution of lower concentration by a semipermeable membrane, is for the solvent on the side of lower concentration to migrate through the membrane to the solution of higher concentration thereby eventually equilibrating the concentrations of the two solutions. The degree of this natural tendency is termed osmotic pressure. The process may be reversed by applying a force to the side of higher concentration in excess of the osmotic pressure to force the pure solvent of the solution of higher concentration through the semipermeable membrane to the side of lower concentration thereby bringing about a separation. The natural tendency which believed to be the result of a difference in free energy resulting from the concentration gradient, is observed to operate at a high thermodynamic efficiency, and at ambient temperature.

Semipermeable membranes proposed in the past have been formed from a variety of materials, and are characterized by the ability to allow one component (e.g., ions or molecules) of a solution to pass through the same to the substantial exclusion of other components (e.g., other ions or molecules). Examples of substances heretofore recognized to possess this property include cellophane (i.e., regenerated cellulose), cellulose esters (e.g. cellulose acetate, cellulose butyrate, etc.), animal or protein membranes, polyelectrolyte complexes, ethyl cellulose, cross-linked polyacrylates, etc.

The semipermeable membranes of the prior art are of limited applicability in many separatory process because of inherent disadvantages relating to their chemical stability, thermal stability, efficiency, length of life, and cost. Generally, the prior art membranes exhibit low thermal stability and therefore cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going through the expense of cooling it. Furthermore, some membranes exhibit a decided decrease in efficiency with increase in temperature or pressure thereby limiting their range of applicability. Solvent susceptibility may be another factor affecting the applicability of a particular porous membrane to a seperation process. Additionally, semipermeable membranes may be inappropriate for a particular application due to low rejection values or low flux.

Representative cellulose acetate membranes, which may be utilized in desalination processes are disclosed in Loeb et al., U.S. Pat. No. 3,133,132, issued May 12, 1964. The Loeb et al. patent also discloses a process for preparing semipermeable membranes involving the casting of a cellulose acetate solution containing a pore producing agent, i.e., an agent which produces a structure which allows an appreciable rate of passage of fresh water under suitable conditions. It has been found, however, that cellulose acetate membranes described therein must be utilized under relatively mild conditions and may not satisfactorily be utilized at elevated temperatures, i.e., in excess of 70 to 80° C. Upon continuous exposure to salt water such cellulose acetate membranes tend to undergo hydrolysis and become less effective for their intended purpose. Also, such membranes may be damaged by contact with a variety of solvents (e.g., phenol, acetone, methyl ethyl ketone, sodium hydroxide solutions, mineral acid solutions), or by bacteriological attack.

The applicability of a particular membrane to the separation of components from solutions appears to depend on both the physical nature of the semipermeable structure and the particular chemical structure of the membrane. It should be noted here that, in accordance with common usage, the terms microporous and semipermeable or permeable will be used interchangeably to denote the character or quality of the membrane which is necessary to render the membrane suitable for the use herein intended. More specifically, the membranes described herein are characterized by the fact that they allow one component of a solution to pass through them while they prevent the passage of another component.

Commonly assigned to U.S. Ser. No. 28,940 of Willard C. Brinegar, filed concurrently herewith, discloses a process for the production of semipermeable polybenzimidazole membranes. The present invention represents an improvement over the basic process of Willard C. Brinegar.

It is an object of the invention to provide a process for the production of improved semipermeable polybenzimidazole membranes.

It is an object of the invention to provide a process for the production of polybenzimidazole membranes which exhibit improved performance properties.

It is an object of the invention to provide improved semipermeable polybenzimidazole membranes which may be utilized to separate components of a solution.

It is an object of the invention to provide improved semipermeable membranes possessing enhanced chemical and thermal stability.

It is another object of the invention to provide improved semipermeable membranes of enhanced solvent resistance.

It is a further object of the invention to provide an improved process for separating the components of an aqueous salt solution utilizing the resulting semipermeable polybenzimidazole membranes.

These and other objects as well as the scope, nature and utilization of this invention will be apparent from the following detailed description.

SUMMARY OF THE INVENTION

It has been found that a process for producing an improved semipermeable membrane comprises:

(a) providing a solution of a polybenzimidazole polymer in a solvent capable of dissolving said polymer,
(b) depositing a film of said solution upon a support,
(c) evaporating an amount of solvent from said film sufficient to allow the formation of a thin solid layer on the exposed surface of said film having a density which is substantially greater than the remaining portion of said film on which said solid layer of increased density is formed, and
(d) washing the resulting film with a non-solvent for said polymer to remove residual solvent thereby producing a semipermeable membrane, and
(e) annealing said resulting semipermeable membrane by contact with an organic liquid at a temperature of about 135 to 300° C. which is a non-solvent for said polymer.

The resulting polybenzimidazole semipermeable membranes may be utilized to separate components of a solution, e.g., salt from an aqueous salt solution by reverse osmosis.

DESCRIPTION OF THE DRAWINGS

FIG. 1 is a graph which illustrates a comparison of flux values achieved in the reverse osmosis desalination of an aqueous 0.5 percent by weight sodium chloride solution at various temperatures utilizing a conventional cellulose acetate semipermeable membrane and a semipermeable polybenzimidazole membrane formed in accordance with the process of the present invention.

FIG. 2 is a graph which illustrates flux as well as rejection values achieved in the reverse osmosis desalination of an aqueous 0.5 percent by weight sodium chloride solution provided at a constant temperature of 50° C. for 50 hours when utilizing a conventional cellulose acetate semipermeable membrane and a semipermeable polybenzimidazole membrane formed in accordance with the process of the present invention.

DESCRIPTION OF PREFERRED EMBODIMENTS

The starting polymer

The polymeric material utilized to form the semipermeable membranes of the present invention is a linear polybenzimidazole. Typical polymers of this class and their preparation are more fully described in U.S. Pat. No. 2,895,948, U.S. Re. Pat. No. 26,065, and in the Journal of Polymer Science, vol. 50, pages 511–539 (1961) which are herein incorporated by reference. The polybenzimidazoles consist essentially of recurring units of the following Formulas I and II.

Formula I is:

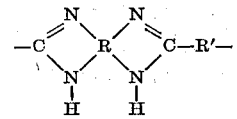

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

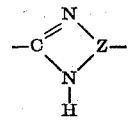

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein R' is an aromatic ring or a heterocyclic ring.

As set forth in U.S. Re. Pat. No. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:

poly-2,2'(m-phenylene)5,5'-bibenzimidazole;
poly-2,2'-(pyridylene-3'',5'')-5,5'-bibenzimidazole;
poly-2,2'-furylene-2'',5'')-5,5-bibenzimidazole;
poly-2,2'-(naphthalene-1'',6'')-5,5'-bibenzimidazole;
poly-2,2'-(biphenylene-4'',4''')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene-5,5'-di(benzimidazole) sulfone;
poly-2,2'(m-phenylene)-5,5'-di(benzimidazole) methane;
poly-2',2''(m-phenylene)-5',5'' di(benzimidazole) propane-2,2; and
poly-2',2''(m-phenylene)-5',5'' di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

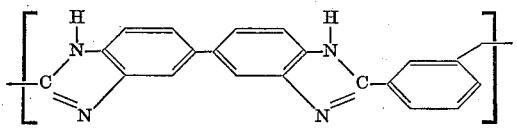

Any polymerization process known to those skilled in the art may be employed to prepare the polybenzimidazole which is utilized to form semipermeable membranes in accordance with the present invention. With respect to aromatic polybenzimidazoles, preferably, equimolar quantities of the monomeric tetraamine and dicarboxyl compound may be introduced into a first stage melt polymerization reaction zone and heated therein at a temperature above about 200° C., preferably at least 250° C., and more preferably from about 270 to 300° C. The reaction is conducted in a substantially oxygen-free atmosphere, i.e., below about 20 p.p.m. oxygen and preferably below about 8 p.p.m. oxygen, until a foamed prepolymer is formed. Usually, the first stage reaction is continued until a prepolymer is formed having an inherent viscosity, expressed as deciliters per gram, of at least 0.1, and preferably from about 0.13 to 0.3 (determined from a solution of 0.4 grams of the polymer in 100 ml. of 97 percent $H_2SO_4$ at 25° C.).

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, e.g. 0.8 to 1.1 or more.

The temperature employed in the second stage is at least 250° C., preferably at least 325° C., and more preferably from about 350 to 425° C. The second stage reaction generally takes at least 0.5 hours, and preferably from about 1 to 4 hours or more.

The polymer solution

The solvents utilized to form the polybenzimidazole polymer solutions include those solvents which are commonly recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. The particularly preferred solvent is N,N-dimethyl acetamide. Additional representative solvents include formic acid, acetic acid, and sulfuric acid.

The polymer solutions may be prepared, for example, by dissolving sufficient polybenzimidazole in the solvent to yield a final solution containing from about 5 to 30 percent by weight of polymer based on the total weight of the solution, and preferably from about 10 to 20 percent by weight.

The quantity of polybenzimidazole dissolved in the solvent should be such that the resulting solution has a viscosity of about 50 to 4000 poises at 30° C., and preferably about 400 to 600 poises.

One suitable means for dissolving the polymer in the solvent is by mixing the materials at a temperature above the normal boiling point of the solvent, for example, about 25 to 120° C. above such boiling point, and at a pressure of 2 to 15 atmospheres for a period of 1 to 5 hours. The resulting solutions then preferably are filtered to remove any undissolved polymer. A minor amount of lithium chloride optionally may be provided in the spinning solution in accordance with the teachings of commonly assigned U.S. Ser. No. 521,501, now Pat. No. 3,502,636 filed Jan. 16, 1966, of Anthony B. Conciatori and Charles L. Smart. The lithium chloride serves the function of preventing the polybenzimidazole polymer from phasing out of the solution upon standing for extended periods of time.

Semipermeable membrane formation

The solution of polybenzimidazole polymer is deposited upon a support to form a wet film of the same. The nature of the support is not critical and may be selected from a variety of materials including ceramic, glass, or metallic plates (e.g., stainless steel). The support is preferably provided with retaining sides, or raised edges, whereby the solution is confined to the surface thereof at the desired location until its consistency is such that retaining sides are no longer needed. Numerous techniques are available for the application of the solution to the support as will be apparent to those skilled in the art. For instance, the polybenzimidazole polymer solution may be simply poured upon a level support in a quantity sufficient for it to assume the desired uniform thickness. A blade optionally may be drawn over the surface of the wet film to aid the deposition of a wet film of uniform thickness. In a preferred embodiment of the invention, the solution is deposited by the utilization of a doctor blade caster.

The thickness of the wet film deposited upon the support is influenced by the desired thickness of the polybenzimidazole semipermeable membrane ultimately to be produced. Commonly the wet film is deposited upon the support in a substantially uniform thickness of about 1 to 30 mils and preferably 2 to 10 mils. In a particularly preferred embodiment of the invention, the wet film is deposited in a thickness of about 4 to 8 mils.

A quantity of solvent is next evaporated from the exposed surface of the wet film to allow the formation of a relatively thin solid layer (i.e. a thin porous polymeric film) on the exposed surface of the same. The thin solid film commonly exhibits a thickness of about 0.1 to 5 microns, and preferably about 1 to 2 microns. During the formation of the solid layer on the exposed surface of the film, the solvent present near the surface of the wet film is flashed off and a thin coagulated solid layer or skin of polybenzimidazole polymer remains. The remaining portion of wet film which supports the solid layer remains essentially unchanged while the solid layer is formed. The solid layer accordingly exhibits a density which is substantially greater than that of the remaining portion of the film which has not undergone coagulation and continues to possess a liquid consistency.

The evaporation of solvent from the exposed surface of the wet film may be accomplished by a variety of techniques as will be apparent to those skilled in the art. For instance, a stream of air or other gas at ambient or at an elevated temperature (e.g., approaching the boiling point of the solvent) may be simply directed at the exposed surface of the wet film. Alternatively, the wet film may by simply allowed to stand in an uncirculated gaseous environment wherein the requisite degree of solvent evaporation is accomplished. In a further embodiment of the invention, the gaseous atmosphere to which the wet film is exposed may be at reduced pressure, e.g., 100 mm. of Hg up to near atmospheric pressure. It will be apparent to those skilled in the art that the rate at which the solvent is evaporated increases with the temperature of the gaseous atmosphere impinging upon the wet film, the flow rate of the gaseous atmosphere, and with reduced pressure. The time required to form the desired thin solid layer upon the exposed surface of the wet film commonly ranges from about 5 seconds to 30 minutes, and preferably from about 1 to 5 minutes. In a preferred embodiment of the invention the wet film is exposed to a stream of circulating air at ambient temperature (e.g. 25° C.) and pressure for about 1 to 5 minutes. When the air is not circulated, longer exposure times advantageously may be employed.

The resulting film bearing a thin solid layer upon its surface is next converted to a semipermeable membrane suitable for separating components of a solution by washing the same with a non-solvent for the polybenzimidazole polymer which is capable of removing residual quantities of the polybenzimidazole solvent. During the wash step, the remaining polybenzimidazole polymer within the wet film is coagulated while the solvent which originally dissolved the same is removed. The wash medium is preferably aqueous in nature and is most preferably water. The wash step is preferably carried out by immersing the film in the wash medium. Alternatively, any other convenient means for contacting the film with the wash medium may be utilized, such as by spraying the film with the same. In a preferred embodiment of the invention a water wash medium is provided at a relatively cool temperature, e.g. at about 5 to 30° C., and at a temperature of about 10 to 25° C. in a particularly preferred embodiment. The time required to accomplish coagulation of the remaining polybenzimidazole polymer and the substantial removal of residual solvent for the same varies with the temperature of the wash medium. The removal of residual solvent usually requires at least about 30 seconds in contact with the wash medium. Satisfactory wash times commonly range from about 30 seconds to 20 minutes, and preferably about 2 to 5 minutes. Considerably longer wash times may be employed, but generally with no commensurate advantage.

The annealing treatment

The semipermeable polybenzimidazole membrane is next annealed by contact with an organic liquid at a temperature of about 135 to 300° C. which is a non-solvent for the polybenzimidazole. The organic liquid is preferably water-miscible.

A preferred class of organic liquids is the polyhydroxy alcohols having 2 to 3 hydroxy groups and 2 to 6 carbon atoms. Representative polyhydroxy aliphatic alcohols of use in the present process include glycols such as ethylene glycol [1,2-ethanediol], propylene glycol [1,2-propanediol], trimethylene glycol [1,3-propanediol], alpha-butylene glycol [1,2-butanediol], beta-butylene glycol [1,3-butanediol], tetramethylene glycol [1,4-butanediol], sym-dimethylethylene glycol [2,3-butanediol], diethylene glycol [2,2'-oxydiethanol], triethylene glycol [2,2'-(ethylenedioxy)diethanol], and hexamethylene glycol [1,6-hexanediol]. Other polyhydroxy aliphatic alcohols such as glycerol [1,2,3-propanetriol] may likewise be selected. The particularly preferred polyhydroxy aliphatic alcohols are ethylene glycol and glycerol. Mono- and dialkyl ethers of ethylene glycol marketed under the trademark Cellosolve may be selected.

It is preferred that the organic liquid has a boiling point in excess of the temperature at which the annealing step is conducted so that this step may be conveniently carried out at atmospheric pressure. If necessary, however, the annealing step may be conducted under superatmospheric pressure conditions.

Contact between the semipermeable polybenzimidazole membrane and the organic liquid is preferably accomplished by immersion. When contact is carried out through immersion, the organic liquid may be heated to the desired temperature prior to immersion, or the liquid may be raised to the desired temperature while in contact with the membrane. Such contact may alternatively be carried out by spraying or other similar techniques as will be apparent to those skilled in the art. It is recommended that the semipermeable membrane be annealed under conditions wherein it is free to shrink. Shrinkages of about 5 to 10 percent in length are commonly observed during the annealing step. It is preferred that the membrane is removed from its support prior to the annealing step.

It has been found that if one attempts to conduct the annealing step of the present process at a temperature below about 135° C. then the desired membrane improvement is not achieved. In a preferred embodiment of the invention the annealing step is conducted at a temperature of about 175 to 225° C. The particularly preferred annealing temperature when employing ethylene glycol as the water miscible organic liquid is 200° C. The particularly preferred annealing temperature when employing glycerol as the water miscible organic liquid is 225° C.

The period of time during which the annealing step is conducted varies with the temperature of the water miscible organic liquid. Generally satisfactory annealing is conducted in at least about 30 seconds. Annealing times commonly range from about 30 seconds to 20 minutes, and preferably about 8 to 12 minutes. Longer residence times for the annealing step tend to be harmful.

The theory whereby the properties of the semipermeable polybenzimidazole membranes are improved through the annealing treatment is considered complex and incapable of simple explanation. It is believed, however, that the microstructure of the membrane contracts to some degree to yield a more uniform configuration. Also, as indicated hereafter the annealing step results in improved performance during desalination separations.

The resulting membrane formed of polybenzimidazole polymer consists of an outer relatively thin porous surface layer formed during the evaporation step adjacent a relatively thick layer of a more porous structure. It is believed that the denser relatively thin outer layer is primarily responsible for the ability described hereafter of the resulting membranes to effect the separation of the components of a solution, and that the remaining more porous portion of the membrane serves primarily a supporting function. The membranes are characterized by high thermal stability and can withstand temperatures during use in excess of 125° C. Also, the membranes exhibit a high degree of chemical stability, and can continue to function in spite of contact with a wide variety of solvents.

The polybenzimidazole membranes of the present invention once positioned upon a conventional porous support such as a porous steel plate, may be utilized to separate components of a solution by a variety of techniques, such as reverse osmosis, electrodialysis or ultrafiltration. For instance, the membranes of the present invention may be used to good advantage in these use areas where cellulose acetate separatory membranes have been used heretofore. However, because of the increased thermal and chemical stability exhibited by the polybenzimidazole membranes, a greater range of operating conditions, e.g., temperatures, may be employed. The theory whereby the membranes of the present invention function to selectively isolate components of a solution is considered complex and incapable of simple explanation. Representative separations which may be accomplished through the use of the polybenzimidazole membranes are as follows: sodium chloride from aqueous solutions of the same, inorganic or higher molecular weight organic salts from aqueous solutions of the same, inorganic or low molecular weight organic acids, etc.

The polybenzimidazole membranes of the present invention are particularly suited for use in desalination operations in which the presence of sodium and chloride ions is diminished in aqueous solutions of the same by reverse osmosis. Once positioned on a conventional porous support the membrane is placed within a conventional reverse osmosis chamber with a solution of lesser salt concentration, e.g., pure water positioned on one side of the membrane and a solution of greater salt concentration on the opposite side. A pressure is exerted on the solution of greater salt concentration which exceeds the natural osmotic pressure and water of a lesser salt concentration is continuously withdrawn on the opposite low pressure side of the membrane. Additional salt water is continuously added to the high pressure side of the membrane and subjected to pressure. Pressures of about 50 to 5000 pounds per square inch and preferably about 600 to 3000 pounds per square inch may be applied to the solution of greater salt concentration to effect the reverse omosis separation.

The free energy of the solvent (i.e., water) in an aqueous sodium chloride solution is less than the free energy of the solvent in the pure state. There results, therefore, a spontaneous tendency for the solvent to move from the relatively high free-energy state of the pure solvent to the relatively low free-energy state of the solution. This tendency can be balanced by increasing the free-energy of the solution by subjecting it to an externally applied pressure. Mathematical derivations to determine the quantitative value of the pressure differential can be found in most physical chemistry texts.

The following examples are given as specific illustrations of the invention. It should be understood, however, that the invention is not limited to the specific details set forth in the examples.

EXAMPLE I

A polybenzimidazole polymer solution having a viscosity of 450 poises at 30° C. was prepared employing N,N-dimethyl acetamide as solvent containing 15 percent by weight poly - 2,2' - (m - phenylene) - 5,5' - bibenzimidazole based upon the total weight of the solution, and 2 percent by weight lithium chloride based upon the total weight of the solution. The dissolution of the polymer was accomplished by agitating the same while in particulate form with the N,N-dimethyl acetamide solvent (in which the lithium chloride was previously dissolved) while in a closed zone at a temperature of about 230° C. The resulting solution was next filtered to remove any residual solids.

A quantity of the polymer solution while at ambient temperature (i.e. about 25° C.) was then poured onto a level smooth glass support having upright edges extending above the surface of the same to a height of approximately 0.008 inch (8 mils). A doctor blade resting on the upright edges of the glass support was then drawn over the surface of the deposited polymer solution at a rate of 0.75 inch per second to insure the formation of a wet film having a uniform thickness.

A stream of air at ambient temperature (i.e. about 25° C.) with a velocity of approximately 2 feet per second was passed over the exposed surface of the wet film causing a portion of the N,N-dimethyl acetamide solvent to evaporate. The exposure time of the film surface to the moving air was 1 minute. This evaporation step caused a relatively thin dense layer to form on the exposed surface of the film supported by a substantially less dense substructure of the polymer solution.

The resulting film while still present upon the smooth glass support was immersed for 10 minutes in a vessel of water having a temperature of about 25° C. While immersed in water, residual quantities of N,N-dimethyl acetamide were essentially completely removed from the film and the remaining polybenzimidazole polymer situated beneath the thin surface layer was coagulated to a solid porous consistency.

Next the resulting polybenzimidazole semipermeable membrane was removed from the glass support and was subjected to an annealing step by contact with a water-miscible organic liquid which is a non-solvent for the polymer. More specifically, the entire membrane along with the glass support was immersed for 10 minutes in a vessel containing ethylene glycol which was maintained at approximately 175° C. The annealed semipermeable membrane was stored by immersion in water provided at ambient temperature (i.e. about 25° C.) prior to being tested in a reverse osmosis separation as described in the procedure set forth following Example III.

EXAMPLE II

The semipermeable membrane formation technique described in Example I was substantially repeated with the exceptions indicated. The exposed surface of the wet film was subjected to a stream of air moving at a velocity of approximately 2 feet per second for a period of three minutes. A relatively thin dense layer formed upon the exposed surface of the film.

Following immersion in a vessel of water, the resulting semipermeable membrane was removed from the glass support and was immersed for 10 minutes in a vessel containing glycerol which was maintained at approximately 200° C.

The annealed semipermeable membrane was stored by immersion in water provided at ambient temperature (i.e. about 25° C.) prior to being tested in a reverse osmosis separation as described in the procedure set forth following Example III.

EXAMPLE III

Example II was repeated with the exception that the annealing step was conducted for 10 minutes by immersing the semipermeable membrane in a vessel containing glycerol which was maintained at 225° C. The annealed semipermeable membrane was stored by immersion in water provided at ambient temperature (i.e. about 25° C.) prior to being tested in a reverse osmosis separation.

The semipermeable polybenzimidazole membranes formed in Examples I, II, and III were tested with 0.5 percent by weight aqueous sodium chloride solutions while employing a conventional flat plate reverse osmosis apparatus. Each membrane was positioned upon a filter paper placed upon a sintered metal plate which served to support the semipermeable membrane during desalination. Each membrane while mounted on its support was positioned in the reverse osmosis apparatus with the membrane surface of higher density facing the sodium chloride solution (i.e. solution of higher concentration), while the opposite surface faced the pure water (i.e. the solution of lesser concentration). An initial operating pressure of 600 lbs. per square inch was applied to the side of the apparatus containing the sodium chloride solution. The solutions were at 25° C. during the reverse osmosis separation. The results of the tests are set forth in the table below.

The rejection value is a relative measure of the ability of the membrane to retard passage of thee component being separated from the solution usually expressed as a weight percentage of the total.

Flux refers to the amount of solvent passing through the membrane per unit area per unit time and is generally expressed in gallons/ft.$^2$/day.

TABLE

| Example No. | Annealing temperature, °C. | Annealing medium | Flux | Percent rejection |
|---|---|---|---|---|
| I | 175 | Ethylene glycol. | 14.0 | 92 |
| II | 200 | Glycerol | 23.0 | 86 |
| III | 225 | ...do... | 20.0 | 87 |

As indicated in the Table, flux rates of 14.0 to 23.0 gallons per square foot per day and rejection rates of 86 to 92 percent were observed for the semipermeable polybenzimidazoles membranes of Examples I, II, and III.

When comparing these flux and rejection values to those reported in commonly assigned U.S. Ser. No. 28,940 of Willard C. Brinegar, filed concurrently herewith which is herein incorporated by reference, it is apparent that improved semipermeable membranes are formed when the membrane formation process incorporates the annealing step as described herein. More specifically, the flux values are substantially increased while preserving relatively high rejection values.

The following Examples IV and V present a comparison of reverse osmosis flux and rejection values obtained when employing a conventional cellulose acetate semipermeable membrane and a semipermeable polybenzimidazole membrane formed in accordance with the present invention.

EXAMPLE IV

For purposes of comparison cellulose acetate (CA) semipermeable membranes were formed in accordance with the process disclosed by Loeb et al. in U.S. Pat. No. 3,133,132. The cellulose acetate membranes were annealed in water at 80° C. to duplicate as nearly as possible the Loeb et al. process. The polybenzimidazole (PBI) membrane used in the comparison was prepared in accordance with the process of the present invention substantially as set forth in Example I, and was annealed while immersed in ethylene glycol for approximately 10 minutes which was provided at 175° C. The test objectives were to determine and compare the functional variations of the two types of semipermeable membranes under analogous operating conditions at various operating temperatures. The membranes were tested in a conventional flat plate reverse osmosis apparatus as in the foregoing examples. The testing conditions employed an aqueous 0.5 percent sodium chloride feed solution at an operating pressure of 600 lbs. per square inch and a surface flow rate of 65 feet per minute. The solutions while in contact with the membranes were subjected in consecutive steps to temperature variations ranging from 25 to 90° C. The membrane rejection for each remained constant at about 95 percent as determined by standard conductivity measurements, while the rate of flux varied considerably over the test cycle. As exemplified in FIG. 1, the results indicate that the polybenzimidazole membrane tends to substantially outperform the cellulose acetate membrane at temperatures above about 60° C. At 90° C. the cellulose acetate membrane ceased to function, while the polybenzimidazole membrane of the present invention continued to function well. Broken lines are shown in FIG. 1 to indicate the time period in which the solution was formed, and times in which the membrane together with the system was brought to the next temperature level.

EXAMPLE V

This example presents a further comparison of reverse osmosis results achieved employing a cellulose acetate (CA) semipermeable membrane identical to those utilized in Example IV. The semipermeable membranes were tested in an identical reverse osmosis apparatus with an aqueous 0.5 percent by weight sodium chloride solution provided at a constant temperature of 50° C., an operating pressure of 600 lbs. per square inch, and a surface flow rate of 65 feet per minute. The flux and rejection values achieved during 50 hours of operation are shown in FIG. 2.

Prior to testing the membranes were preconditioned for 72 hours under the same operating conditions with the exception that the solution was provided at 25° C.

The superiority of the polybenzimidazole membranes is apparent from a review of FIG. 2. While each membrane maintained a satisfactory rejection value, the flux values obtained with the cellulose acetate membrane were consistently lower. After 50 hours of operation at 50° C., the cellulose acetate membrane showed a tendency to drop-off in flux at a more rapid rate than the polybenzimidazole membrane.

Although the invention has been described with preferred embodiments, it is understood that variations and modifications may be resorted to as will be apparent to those skilled in the art. Such variations and modifications are to be considered within the purview and scope of the claims appended hereto.

I claim:

1. A process for producing a semipermeable membrane comprising:
   (a) providing a solution of a polybenzimidazole polymer in a solvent capable of dissolving said polymer,
   (b) depositing a film of said solution upon a support,
   (c) evaporating an amount of solvent from said film sufficient to allow the formation of a thin solid layer on the exposed surface of said film having a density which is substantially greater than that of the remaining portion of said film on which said solid layer of increased density is formed,
   (d) washing the resulting film with a non-solvent for said polymer to remove residual solvent thereby producing a semipermeable membrane, and
   (e) annealing said resulting semipermeable membrane by contact with an organic liquid at a temperature of about 135 to 300° C. which is a non-solvent for said polymer.

2. A process according to claim 1 wherein said polybenzimidazole polymer consists essentially of recurring units of the formula:

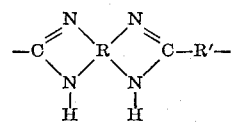

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from 4 to 8 carbon atoms, and (3) a heterocyclic ring selected from the group consisting of (a) pyridine, (b) pyrazine, (c) furan, (d) quinoline, (e) thiophene, and (f) pyran.

3. A process according to claim 1 wherein said polybenzimidazole polymer is poly-2,2,'-(m-phenylene)-5,5'-bibenzimidazole.

4. A process according to claim 1 wherein said solvent capable of dissolving said polymer is selected from the group consisting of N,N-dimethyl acetamide, N,N-dimethyl formamide, dimethyl sulfoxide and N-methyl-2-pyrrolidone.

5. A process according to claim 1 wherein said solvent is N,N-dimethyl acetamide.

6. A process according to claim 4 wherein said polybenzimidazole polymer is present in said solvent in a concentration of about 5 to 30 percent by weight based upon the total weight of the solution.

7. A process according to claim 1 wherein said film is deposited on said support in a thickness of about 1 to 30 mils.

8. A process according to claim 1 wherein said thin solid layer formed upon the surface of said film by the evaporation of said solvent has a thickness of about 0.1 to 5 microns.

9. A process according to claim 1 wherein said resulting film is washed in water to remove residual solvent and thereby produce a semipermeable membrane.

10. A process according to claim 9 wherein said water is present at a temperature of about 5 to 30° C.

11. A process according to claim 1 wherein said annealing step is conducted from about 30 seconds to 20 minutes.

12. A process according to claim 1 wherein said organic liquid is a polyhydroxy aliphatic alcohol having 2 to 3 hydroxy groups and 2 to 6 carbon atoms.

13. A process according to claim 1 wherein said organic liquid is ethylene glycol.

14. A process according to claim 1 wherein said organic liquid is glycerol.

15. A process according to claim 1 wherein said organic liquid is at a temperature of about 175 to 225° C.

16. A process according to claim 1 wherein said annealing step is conducted under conditions wherein said semipermeable membrane is free to shrink.

17. A semipermeable membrane consisting essentially of polybenzimidazole polymer formed in accordance with the process of claim 1.

18. A process for producing a semipermeable membrane comprising:
  (a) providing a solution of a polybenzimidazole polymer in a solvent selected from the group consisting of N,N-dimethyl acetamide, N,N-dimethyl formamide, dimethyl sulfoxide and N-methyl-2-pyrrolidone with said polymer being present in a concentration of about 5 to 30 percent by weight based upon the total weight of the solution,
  (b) depositing a film of said solution upon a support in a thickness of about 1 to 30 mils,
  (c) evaporating an amount of said solvent from said film sufficient to allow the formation of a thin solid layer having a thickness of about 0.1 to 5 microns on the exposed surface of said film having a density which is substantially greater than that of the remaining portion of said film on which said solid layer of increased density is formed,
  (d) washing the resulting film with water at a temperature of about 5 to 30° C. to remove residual solvent thereby producing a semipermeable membrane, and
  (e) annealing said resulting semipermeable membrane by contact for about 30 seconds to 20 minutes with an organic liquid selected from the group consisting of ethylene glycol and glycerol at a temperature of about 175 to 225° C. under conditions wherein said membrane is free to shrink.

19. A process according to claim 18 wherein said solvent is N,N-dimethyl acetamide.

20. A process according to claim 18 wherein said polybenzimidazole polymer is poly-2,2'-(m-phenylene)-5,5'-bibenzimidazole.

21. A proces for the desalination of water comprising:
  (a) providing a solution of a polybenzimidazole polymer in a solvent capable of dissolving said polymer,
  (b) depositing a film of said solution upon a support,
  (c) evaporating an amount of solvent from said film sufficient to allow the formation of a thin solid layer on the exposed surface of said film having a density which is substantially greater than that of the remaining portion of said film on which said solid layer of increased density is formed,
  (d) washing the resulting film with a non-solvent for said polymer to remove residual solvent thereby producing a semipermeable membrane,
  (e) annealing said resulting semipermeable membrane by contact with an organic liquid at a temperature of about 135 to 300° C. which is a non-solvent for said polymer,
  (f) positioning said annealed semipermeable membrane while adjacent a porous support within an aqueous sodium chloride solution wherein the concentration of dissolved sodium chloride in said solution is greater on one side of said membrane than upon the other side of said membrane,
  (g) applying a pressure of about 600 to 3000 pounds per square inch to that portion of said sodium chloride solution having a greater concentration of sodium chloride dissolved therein thereby causing water to pass through said semipermeable membrane to the substantial exclusion of dissolved sodium chloride, and
  (h) recovering said solution from said side of said membrane having a lesser concentration of sodium chloride dissolved therein.

References Cited
UNITED STATES PATENTS

| | | | |
|---|---|---|---|
| 3,526,588 | 9/1970 | Michaels et al. | 210—23 |
| 3,556,992 | 1/1971 | Massucco | 210—500 X |
| 3,567,632 | 3/1971 | Richter et al. | 210—500 X |
| 3,567,810 | 3/1971 | Baker | 210—500 X |
| 3,556,305 | 1/1971 | Shorn | 264—49 X |
| 3,522,335 | 7/1970 | Rowley | 210—500 X |
| 3,527,853 | 9/1970 | Rowley et al. | 210—500 X |
| 3,497,072 | 2/1970 | Cannon | 264—49 X |

REUBEN FRIEDMAN, Primary Examiner

R. BARNES, Assistant Examiner

U.S. Cl. X.R.
210—500; 264—216